United States Patent [19]

Wagner

[11] 4,346,671

[45] Aug. 31, 1982

[54] FEED AND ANIMAL ENCLOSURE

[75] Inventor: Robert L. Wagner, Hampton, Iowa

[73] Assignee: Ram Handler, Ltd., Kesley, Iowa

[21] Appl. No.: 205,264

[22] Filed: Nov. 10, 1980

[51] Int. Cl.³ .......................... A01K 5/00; E04H 17/18
[52] U.S. Cl. ......................................... 119/60; 256/26
[58] Field of Search ............... 119/20, 58, 60; 256/26, 256/65, 73

[56] References Cited

U.S. PATENT DOCUMENTS

| | | | |
|---|---|---|---|
| 2,736,041 | 2/1956 | Maloof | 119/20 |
| 3,204,606 | 9/1965 | Parr et al. | 256/26 X |
| 3,804,065 | 4/1974 | Coates | 119/20 X |
| 4,193,378 | 3/1980 | Harden | 119/60 |

FOREIGN PATENT DOCUMENTS 762710 12/1956 United Kingdom ................. 256/26

Primary Examiner—Gene Mancene
Assistant Examiner—Robert P. Swiatek
Attorney, Agent, or Firm—Zarley, McKee, Thomte, Voorhees & Sease

[57] ABSTRACT

A plurality of identical panel sections are pivotally interconnected by a pin received in aligned sleeves. The sections may pivot in one direction until adjacent corners abut and in the opposite direction until the sections abut against a horizontally extending pin end portion thereby limiting further the angle of pivotal movement.

3 Claims, 9 Drawing Figures

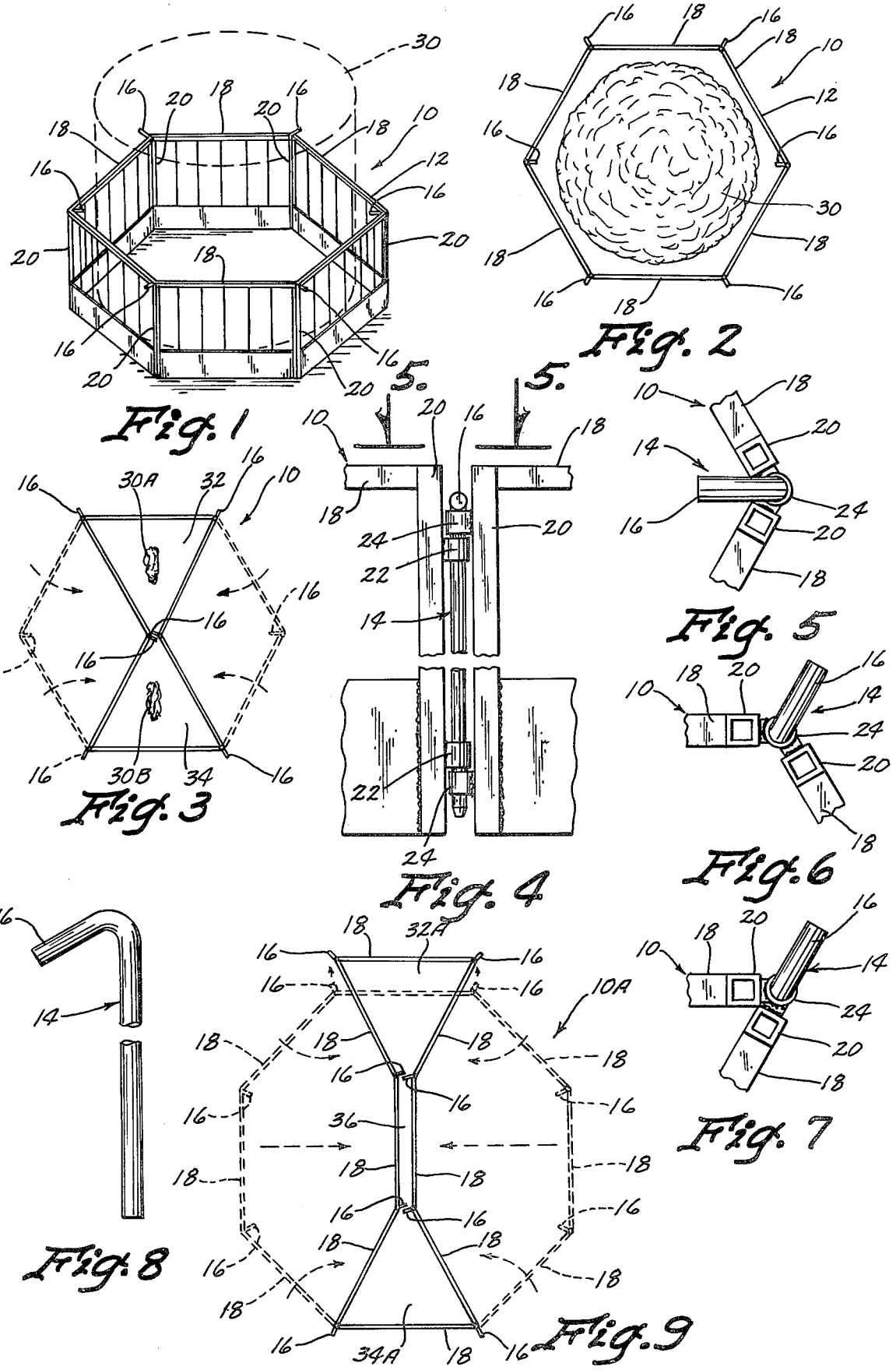

FEED AND ANIMAL ENCLOSURE

BACKGROUND OF THE INVENTION

A hay feeder for round bales and rectangular loaf type stacks is needed which will also function as an animal enclosure. This enclosure should be one that will not readily fall over due to the sections being pivoted so far that the enclosure has lost the necessary spaced apart support to maintain the enclosure upright. The enclosure should be capable of easily and quickly being assembled and disassembled.

SUMMARY OF THE INVENTION

Any number of different configurations can be constructed using the appropriate number of identical panel sections. The end portions of the interconnecting pins are turned either inwardly or outwardly depending on the range of pivotal movement contemplated during the course of use. As noted, the adjacent sections cannot pivot as far towards each other when the end portion is therebetween as they can pivot away from the end portion when only the abutment between the section ends limits the movement towards each other.

It is thus seen that a wide variety of different shaped enclosures are possible and in no event will these enclosures ever be moved by animals or otherwise to a position where the enclosure will not remain upright. The enclosure can however be quickly assembled and disassembled by the simple insertion and removal of the pin through the aligned sleeves on the adjacent section ends.

DESCRIPTION OF THE DRAWINGS

FIG. 1 is a perspective view of an enclosure for round bales or the like.

FIG. 2 is a top plan view thereof.

FIG. 3 is a top plan view similar to FIG. 2 but showing the hay being fed down to two small sections disposed in the resulting triangular feeding areas.

FIG. 4 is a enlarged fragmentary elevational view of interconnected section ends.

FIG. 5 is a fragmentary top plan view thereof taken along line 5—5 in FIG. 4.

FIGS. 6 and 7 are a view similar to FIG. 5 but showing the sections pivoted to optional angular positions possible by the appropriate positioning of the end portion of the pin.

FIG. 8 is a fragmentary side elevational view of the pin.

FIG. 9 is a top plan view of the panel sections in an alternate configuration from that shown in FIG. 3.

DESCRIPTION OF THE PREFERRED EMBODIMENT

The feed and animal enclosure of this invention is referred to generally in FIG. 1 by the reference numeral 10 and includes individual panel sections 12 pivotally interconnected by a connecting rod 14 having an upper horizontally extending end portion 16.

The individual panel sections 10 include a frame 18 including vertical square in cross section end members 20 which carry outwardly positioned top and bottom sleeves 22 and 24, respectively, for receiving the pin or rod 14.

The angular movement between the panel sections 10 towards each other but away from the end portion 16 of the rod 14 is shown in FIG. 7 and is limited by the corners which abut. When the sections 10 are pivoted towards the end portion 16 as seen in FIG. 5 the corners abut against the end portion 16 and limit the pivotal movement to something less than that shown in FIG. 7 when pivotal movement is limited only by the corners abutting.

In operation it is seen that, for example, in FIG. 3 the enclosure 10 started out in a generally circular arrangement enclosing a round bale 30. As the bale is fed upon by animals and reduced to two pieces 30A and 30B, the panel sections are pivotally collapsed by the animals to form two triangular feeding areas 32 and 34. The enclosure cannot be collapsed so far that it becomes unstable and falls over. The end portions 16 on the oppositely disposed sections extend outwardly to allow maximum pivotal movement of the side sections towards each other to form the triangular shaped feeding areas 32 and 34 while the pin end portions 16 at the apexes of the triangular feeding areas 32 and 34, extend inwardly thereby necessarily making the enclosure pivot to the solid line position from the dash line position shown in FIG. 3.

As seen in FIG. 9, the enclosure 10A includes eight sections as compared to the six of the enclosure 10 and thus in addition to the triangular feeding areas 32A and 34A, a rectangular feeding area 36 is formed. The end portions of the pins associated with the feeding area 36 are facing inwardly while the pins at the outer ends of the oppositely disposed triangular feeding areas have their end portions 16 extending outwardly.

Thus it is seen that the enclosure is easily assembled and disassembled and is always stable against being upset.

I claim:

1. A feed and animal enclosure comprising,
   a plurality of pivotally interconnected sections,
   each pair of interconnected sections including vertically aligned sleeves on adjacent section ends,
   a pin received in said aligned sleeves,
   said pin including an end portion extended generally horizontally between said section ends,
   said sleeves and section ends being of a size and position relative to one another such that two adjacent sections may pivot towards each other in a direction away from said pin end portion to positions wherein the included angle between said adjacent sections is less than 90° and wherein abutment of said section ends with one another limits further pivotal movement towards each other, and
   said pin end portion being of a size to limit pivotal movement of said two adjacent sections in a direction towards said pin end portion to positions wherein the included angle between said adjacent sections is obtuse and wherein abutment of said section ends with said pin end portion limits further pivotal movement towards each other whereby said interconnected sections, when pivoted in one direction, abut against each other and, when pivoted in the opposite direction, abut the adjacent pin end portion.

2. The structure of claim 1 wherein said end portions on said pins interconnecting adjacent sections of said enclosure extend in the appropriate inward or outward direction to allow said enclosure to move to only certain predetermined configurations.

3. The structure of claim 1 wherein said ends of said sections include square in cross section vertical frame members which abut at adjacent corners when said sections are pivoted towards each other.

* * * * *